Oct. 1, 1935.　　　　S. I. FINEMAN　　　　2,015,889
ARTIFICIAL GRASS MAT
Filed June 6, 1934　　　　2 Sheets-Sheet 1

INVENTOR.
Saul I. Fineman.
BY
ATTORNEY.

Oct. 1, 1935.  S. I. FINEMAN  2,015,889
ARTIFICIAL GRASS MAT
Filed June 6, 1934   2 Sheets-Sheet 2
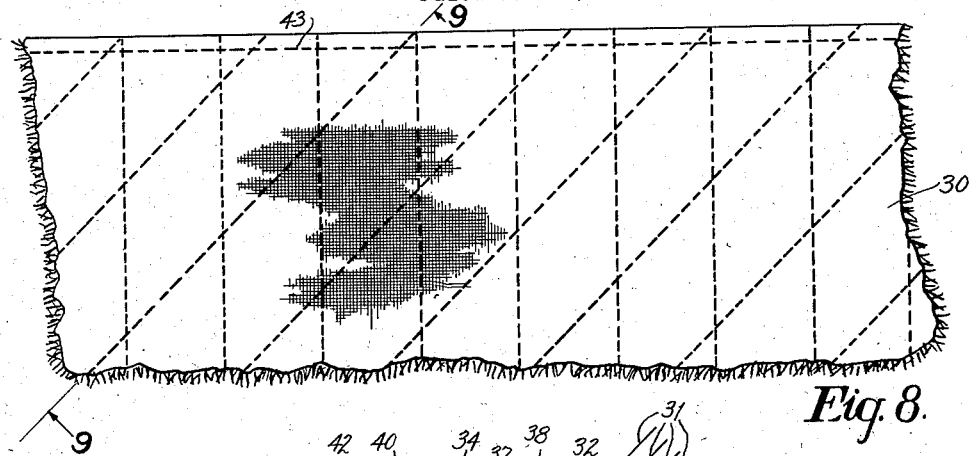
Fig. 8.
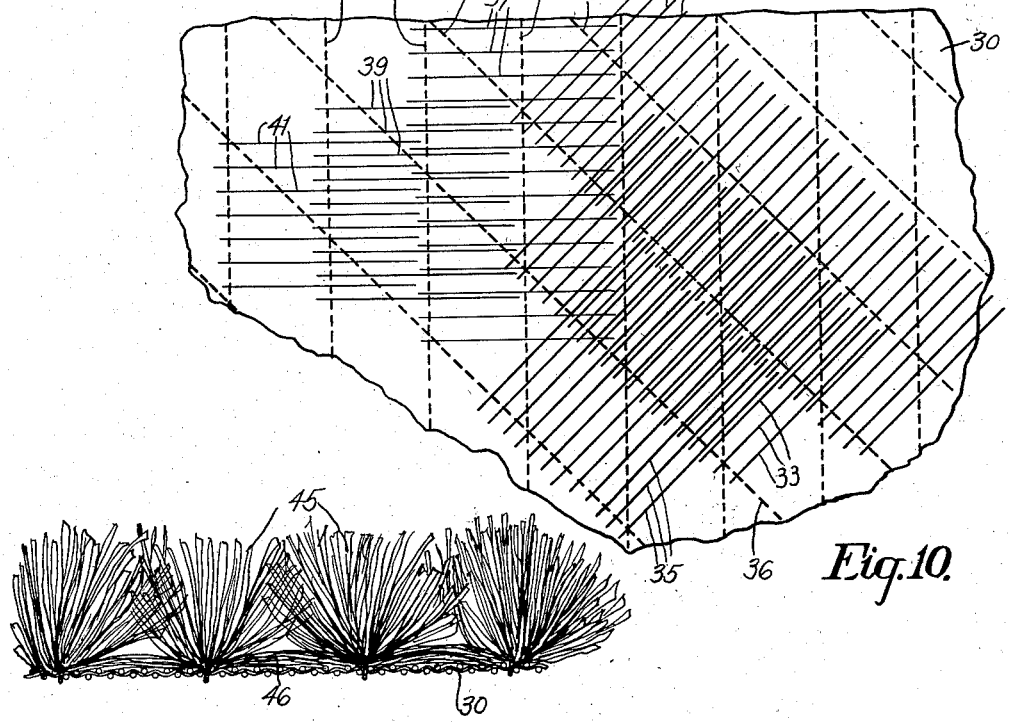
Fig. 10.
Fig. 9.
Fig. 7.
INVENTOR.
Saul I. Fineman.
BY
ATTORNEY.

Patented Oct. 1, 1935

2,015,889

UNITED STATES PATENT OFFICE 2,015,889

ARTIFICIAL GRASS MAT

Saul I. Fineman, Cleveland, Ohio

Application June 6, 1934, Serial No. 729,268

11 Claims. (Cl. 27—30)

This invention relates to artificial grass material, grass mats and the like; and relates particularly to artificial grass mats for decorative interment purposes.

It is an object of my invention to provide an improved construction of artificial grass mat or the like.

Another object is to provide an artificial grass mat construction which will have improved durability when subjected to rough handling and repeated usage.

Another object is to provide an artificial grass mat construction having an improved mode of operation when employed for decorative interment purposes.

Another object is to provide an improved method and means of decorating an open grave during the interment ceremony.

Other objects will be apparent to those skilled in the art to which my invention appertains.

My invention is fully disclosed in the following description taken in connection with the accompanying drawings, in which:

Fig. 7 is a fragmentary sectional view taken from the plane 7—7 of Fig. 6 and drawn to a larger scale;

Fig. 8 is a fragmentary view to an enlarged scale approximately full size of the under side of a grass mat illustrating a construction of mat suitable for use in the practice of my invention;

Fig. 9 is a cross-sectional view of the grass mat of Fig. 8, the view being considered as taken from the plane 9—9 of Fig. 8 and turned right side up;

Fig. 10 is a diagrammatic view further illustrating the construction of the grass mat of Figs. 8 and 9.

Figure 1:
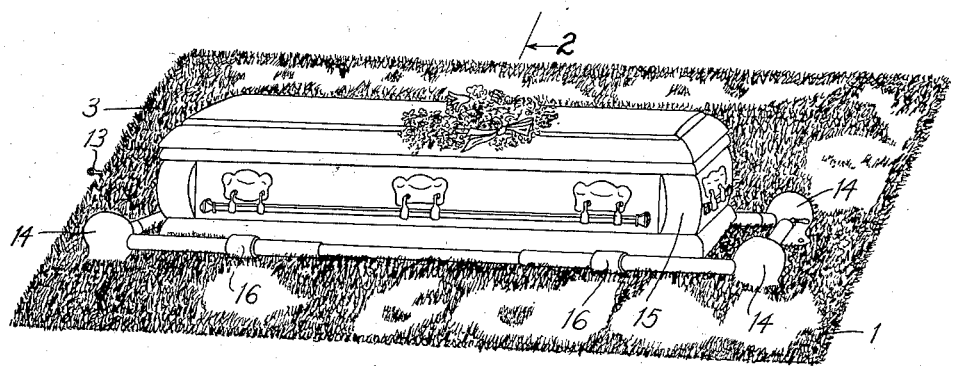
Fig. 1 is a perspective view illustrating an embodiment of my invention and a mode of operation thereof.
Figure 2:
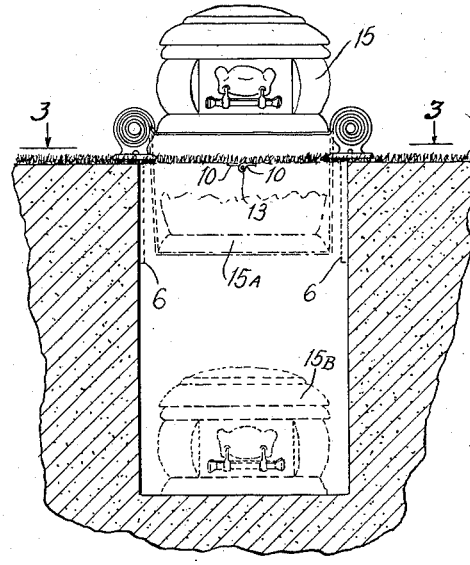
Fig. 2 is a sectional view taken approximately from the plane 2—2 of Fig. 1 with some parts thereof in elevation and other parts reproduced in operated positions in dotted line to further illustrate the mode of operation of my invention.
Figure 3:
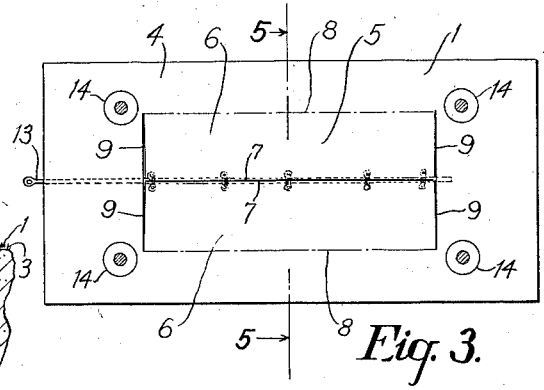
Fig. 3 is a top plan view of a grass mat embodying my invention, the view being taken approximately from the plane 3—3 of Fig. 2 and rotated through 90°, the view being diagrammatic in some respects.
Figure 4:
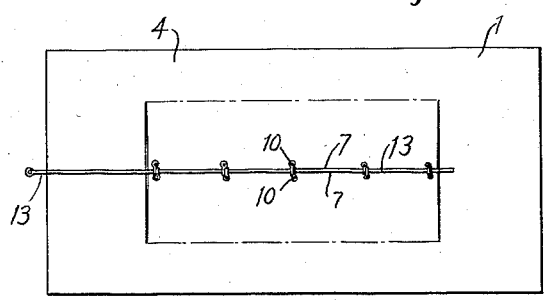
Fig. 4 is a diagrammatic view of the under side of the grass mat of Fig. 3.
Figure 5:
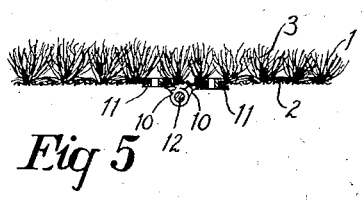
Fig. 5 is a fragmentary view to an enlarged scale taken from the plane 5—5 of Fig. 3 and showing parts omitted from the diagrammatic showing of Fig. 3.

Referring to the drawings, in Figs. 1, 2 and 5, at 1 I have illustrated a grass mat embodying my invention comprising a flexible base preferably of fabric such as burlap, duck, canvas or the like, 2, shown particularly in Fig. 5, having secured to the upper side thereof upstanding blades of artificial grass or the like, 3, the grass mat being diagrammatically illustrated in Figs. 3 and 4 merely by the outline of the parts thereof, to simplify the drawings and to render the construction and mode of operation thereof clearer.

In the preferred practice of my invention, the grass mat 1 is rectangular in shape, of the general proportions of the mouth of a grave in connection with which it is to be used for decorative interment purposes, and is preferably all in one piece or comprises a plurality of pieces all secured together, for example by sewing the same, so that when completely assembled the grass mat may be handled as a single piece. The grass mat, Figs. 3 and 4, comprises an outer border portion 4 large enough to overlap the ground surrounding and adjacent to the grave mouth; and comprises an inner or central portion 5 adapted to be laid directly over the open mouth of the grave. The central portion 5, in the form of Figs. 3 and 4, comprises a pair of flap portions 6—6 meeting along the longitudinal line of the mat as at 7 and adapted to bend downwardly with a hinging action along lines 8—8, the opposite ends of the flap portions 6 being separate from the ends of the border portion 4 by slits 9—9 completing the flap form of the flaps 6—6.

The under sides of the flaps 6—6 at longitudinally spaced points along the meeting edges 7—7 thereof, have secured thereto, respectively, pairs of securing devices 10—10 each comprising bases 11—11, Fig. 5, adapted to be secured to portions of the flaps adjacent the edges 7 in any suitable manner, for example as by riveting them thereto as shown in Fig. 5, and each comprising an eye 12, the eyes of the two securing devices 10—10 of each pair being in alignment; and the several devices 10—10 along the edges 7—7 having all of the eyes 12 thereof disposable in alignment. A rod or wire 13 is projected through all of the eyes and, in cooperation with the devices 10—10, thus secures the adjacent edge portions 7 of the flaps 6—6 together, holding the flaps in the normal plane of the mat 1 as a whole, and preventing the flaps from bending or hinging around lines 8—8.

The mat as above described is, in the use thereof, at a funeral ceremony in the cemetery, laid upon the grave entirely covering and concealing it. The casket supporting frame of usual or suitable construction is then laid upon the mat, being supported by the four-corner posts or pedestals 14—14, the latter being supported by the ground under the mat adjacent the grave mouth.

The casket 15 is then laid upon the straps 16 of the frame preparatory to lowering it into the grave. The ceremony may now proceed and if desired the bereaved ones may leave at the conclusion of the ceremony with the casket still supported as described and as illustrated in Fig. 1.

Thereafter, the undertaker in charge of the ceremony may cause the rod 13 to be withdrawn whereupon the flaps 6—6 will be released and the casket 15 lowered into the grave by operation of the straps 16 in the usual manner. During this operation the flaps 6 may bend downwardly around the lines 8—8 into the position illustrated in dotted lines in Fig. 2, and an opening is thus made in the mat 1 approximately the size of the grave. The casket 15 will, on being lowered into the grave, take up the position illustrated at 15A and may ultimately be deposited in the bottom of the grave as at 15B. The frame may then be removed and the grass mat may be picked up as a unit and taken away by the undertaker.

It will thus be apparent that I have provided an original and improved form of ceremony in connection with the mode of operation described for my improved grass mat, and have provided an improved grass mat making such improved ceremony possible.

Figure 6:
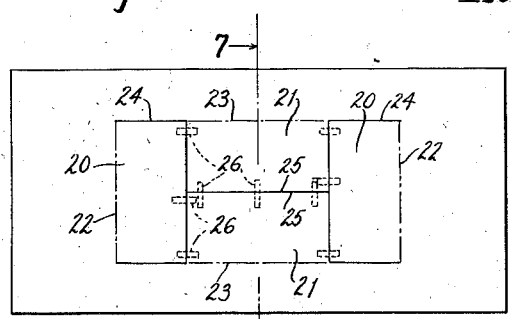
Fig. 6 is a view generally similar to Fig. 3 but illustrating a modification.

In Figs. 6 and 7 I have illustrated another construction for the flaps in the central portion of the mat. Here four flaps are provided, a pair of end flaps 20—20 and a pair of intermediate flaps 21—21, the end flaps hinging around lines 22—22 and the intermediate flaps hinging around lines 23—23; the flaps being provided by slits in the mat generally in the form of back-to-back confronting U-form slits 24—24 intermediately connected by longitudinal slits 25. Each flap is connected to others of the flaps on the under side of the mat base by devices 26 one of which is shown to an enlarged scale and in cross-section in Fig. 7. The device 26 comprises a pair of angle-form pieces 27—27 secured as by rivets 28 to the under side of the mat fabric or other base 29 with legs 47—47 of the angle pieces closely adjacent and adjacent the edges of a pair of flaps, for example the slit edges 25—25 of the intermediate flaps 21—21.

A fastening device of the class known as a glove fastener, 48, is provided comprising a male portion 49 and a female portion 50, secured respectively to the angle legs 47—47. When the mat is laid upon the grave, the fastening devices 26 are all in engaged condition retaining the flaps in the general plane of the base.

In the operation of this form, when the time has come to lower the casket into the grave, it is lowered by operation of the supporting frame and straps 16 and the weight of the casket upon the central portion of the mat will cause the fastening devices 48 to be released one after the other requiring no further manual operation of the mat and the flaps each bending downwardly along an inner wall of the grave and the casket being lowered therethrough. Thereafter, as described in connection with the first form, the mat may be removed and taken away after the lowering frame has been removed therefrom.

As will be apparent therefore, the flaps may be of various shapes and disposition, two forms therefor being shown and described above, and various securing and attaching devices may be provided to temporarily hold them in elevated grave-covering position within the scope of my invention.

A mat suitable for the above-described operative and decorative purposes may be made as stated, by attaching strips to a flexible base, preferably strips of dried raffia grass sewed to a fabric base. In the practice of my invention as above described, however, it is highly desirable that the fabric be at all times covered by the grass strips and that a very strong durable mat be provided to insure repeated uses thereof without rapid deterioration the mat being repeatedly bent at the hinge line of the flap or flaps; and when my invention is practiced as illustrated in Figs. 6 and 7, the mat being subjected to strains when the casket is lowered therethrough. I therefore will now describe one method by which a mat suitable for the practice of my invention may be constructed.

A piece of the base fabric 30, Figs. 8 to 10, is laid upon a stitching or sewing machine. Strips of dried grass 31—31 are laid in parallel relation and in a diagonal direction across preferably the diagonal center line of the piece of fabric, which piece is approximately the size and shape of the finished rectangular mat. The strips 31 are then sewed with a row of stitching 32, the stitching 32 running as stated diagonally across the fabric base approximately on the center line thereof, sewing the strips 31 to the base by substantially their middle or at least their intermediate portions. The stitching 32 and strip 31 may extend entirely across the base from one edge to the other thereof.

A group of strips 33—33 is laid parallel to the strips 31 with end portions thereof overlapping adjacent end portions of the strips 31. It may be stated at this point that in the diagrammatic showing of Fig. 10, the strips are each indicated by a single line, whereas as a matter of fact the raffia or other dried grass strips may be an eighth of an inch wide or of approximately such dimensions. A second stitch row 34 is then sewed parallel to the row 32 and sewing the intermediate portion of the strips 33—33 and also the adjacent end portion of the first group strips 31—31. A third row of strips 35—35 is then laid parallel to the strips 31 and 33 and overlapping adjacent end portions of the strips 33 and another row of stitching 36 is made, sewing down to the fabric the intermediate portions of the strips 35 and the adjacent end portions of the strips 33.

This procedure is continued until the entire fabric base is covered with a layer of strips, some of which as described are sewed to the fabric by both an intermediate and an end portion, and other portions of the strips having free end portions. This constitutes what may be called a first layer of strips on the base.

Another layer of strips is now applied in the following manner. A row of strips 37 is laid upon the first layer, the strips of the group being generally parallel to each other but at an angle to the direction of the strips of the first layer, and are sewed through the first layer and to the fabric by a row of stitching 38 at an angle to the stitching 32—34—36, the stitching 38 being preferably parallel to one edge of the finished rectangular mat or the fabric base thereof.

Another group of strips 39 is then laid on top of the first layer, overlapping adjacent end portions of the strips 37, and by a row of stitching 40, the intermediate portions of said strips 39 and adjacent end portions of the first laid strips 37 are sewed down through the first layer and to the fabric.

Another layer of strips 41 is laid parallel to the strips 39 and 37 with end portions overlapping adjacent end portions of the strips 39, and by means of a row of stitching 42 the intermediate portions of the strips 41 and the end portions of the strips 39 are sewed. The rows of stitching 38, 40 and 42 are all preferably parallel to each other.

This process is continued until a second complete layer is applied.

While in the diagrammatic showing of Fig. 10, the strips are laid only on fragmentary portions of the base, it will be understood that each row of strips applied and each row of stitching extends entirely across the fabric base. And in the preferred method, the first diagonal row is as above stated made along a diagonal center line; and successive rows are applied at both sides of the center row until the entire base is covered by the first layer; and the second layer is started by a row along a center line parallel to a side edge of the base and successive rows are applied at both sides of this center row until the base is entirely covered with a second layer.

The directions of the rows of stitchings 32, 34, 36, and the rows 38, 40 and 42 are preferably chosen so that a generally diamond-shaped pattern is repeated all over the base, as clearly shown in Figs. 8 and 10. Rows of stitching 43 along the outer edges of the base may be applied to reinforce the same, and the hinging lines 8—8 of Fig. 3 and the hinging lines 22 and 23 of Fig. 6 may be reinforced by stitching or otherwise.

The above described method of applying strips to the base not only provides upstanding pieces or end portions as shown for example at 45, Fig. 9, simulating closely growing grass, but provides also strip portions 46 sewed down to the upper side of the base 30 completely covering the same. At no place can the fabric be seen, even if the upstanding strip portions 45 are parted to view the same. Thus a thick mat simulating grass and sod is provided without a visible portion of the underlying fabric anywhere, and the same may be bent at the hinging lines above described without undue rapid deterioration. The entire mat is strong and flexible, being bound together at all parts not only by the stitching above described in diamond pattern, but by the strip portions 46, Fig. 9, interconnecting and binding together adjacent portions of the base throughout.

Of course, the thickness of the upstanding strips 45 and fabric covering strips 46, Fig. 9, may be predetermined by applying any desired numbers of strips per lineal inch, for example any number of strips 31 per inch along the stitching row 32; and likewise for the other groups and stitches.

My invention is not limited to the exact details of construction shown and described; other changes and modifications than those shown may be made within the spirit of my invention without sacrificing its advantages and within the scope of the appended claims.

I claim:

1. A grass mat construction for interment purposes comprising a body portion formed to overlap the ground adjacent the mouth of the grave and a portion in the form of a flap hingingly connected thereto, means for normally holding the flap in generally horizontal position over the open grave, releasing means comprising a horizontally movable element accessible at a point laterally of the grave mouth and operable by horizontal movement thereof to release the flap to permit it to bend downwardly into the grave.

2. A grass mat construction for interment purposes comprising a border portion formed to overlap the ground adjacent the mouth of a grave and an inner portion in the form of a plurality of flaps connected thereto, means for normally holding the flaps in generally horizontal positions to cover and conceal the open mouth of the grave, comprising means for connecting together adjacent portions of different flaps and the means being operable to release the flaps to permit them to bend downwardly into the grave to permit a casket to be lowered thereinto through the mat.

3. A grass mat construction for interment purposes comprising a border portion formed to overlap the ground adjacent the mouth of a grave and an inner portion in the form of a plurality of flaps connected thereto, means for normally holding the flaps in generally horizontal positions to cover and conceal the open mouth of the grave, comprising means for connecting together adjacent portions of different flaps and the means being operable by movement of a casket lowered into the grave to release the flaps to permit them to bend downwardly into the grave.

4. A grass mat construction for interment purposes comprising a body portion adapted to lie on the ground adjacent the mouth of a grave and a flap portion adapted to be normally disposed in substantially horizontal grave mouth covering position, and hingingly connected to the body portion to permit it to depend into the grave so that a casket may be lowered thereinto, means holding the flap portion in normal position comprising a securing element on the flap portion and another securing element engaged therewith, means for supporting the other securing element, and disengaging means operable by manually effected horizontal movement thereof to disengage the elements.

5. A grass mat construction for interment purposes comprising a body portion formed to lie upon the ground adjacent the mouth of a grave and a portion in the form of a flap hingingly connected thereto, means for normally supporting the flap substantially in horizontal grave mouth covering position comprising attaching means connecting an edge portion of the flap with another portion of the mat construction, the attaching means being operable to disconnect the flap to permit it to hingingly depend into the grave.

6. A grass mat construction for interment purposes comprising a body portion formed to lie upon the ground adjacent the mouth of a grave and a portion in the form of a flap hingingly connected thereto, means for normally supporting the flap substantially in horizontal grave mouth covering position comprising attaching means connecting an edge portion of the flap with another portion of the mat construction, the attaching means being operable to disconnect the flap to permit it to hingingly depend into the grave, and means for operating the attaching means at a point laterally of the grave mouth.

7. A grass mat construction for interment purposes comprising a body portion formed to lie upon the ground adjacent the mouth of a grave and a central portion comprising a pair of flaps hingingly connected to the body portion at opposite portions thereof, means supporting the flaps in substantially horizontal grave mouth covering position comprising attaching means connecting confronting edge portions of the opposite flaps, the attaching means being operable to disconnect the flaps to permit them to hingingly depend into the grave.

8. A grass mat construction for interment purposes comprising a body portion formed to lie upon the ground adjacent the mouth of a grave and a portion in the form of a flap hingingly connected thereto, means for normally supporting the flap in substantially horizontal grave mouth covering position comprising attaching means connecting an edge portion of the flap at a linear series of points to another portion of the mat construction, and a single means operable to disconnect the flap at said points successively to permit the flap to hingingly depend into the grave.

9. A grass mat construction for interment purposes comprising a body portion formed to lie upon the ground adjacent the mouth of a grave and a portion in the form of a flap hingingly connected thereto, means for normally supporting the flap in substantially horizontal grave mouth covering position comprising attaching means connecting an edge portion of the flap at a linear series of points to another portion of the mat construction, and a single means operable by horizontal force applied thereto at a point laterally of the grave mouth to disconnect the flap at said points successively to permit the flap to hingingly depend into the grave.

10. A grass mat construction for interment purposes comprising a body portion formed to lie upon the ground adjacent the mouth of a grave and a central portion comprising a pair of flaps hingingly connected to the body at opposite portions thereof, means supporting the flaps in substantially horizontal grave mouth covering position comprising attaching means connecting confronting edge portions of the opposite flaps at a linear series of points, and a single means operable to disconnect the flaps from each other at said points successively to permit the flaps to hingingly depend into the grave.

11. A grass mat construction for interment purposes comprising a body portion formed to lie upon the ground adjacent the mouth of a grave and a central portion comprising a pair of flaps hingingly connected to the body at opposite portions thereof, means supporting the flaps in substantially horizontal grave mouth covering position comprising attaching means connecting confronting edge portions of the opposite flaps at a linear series of points, and a single means operable by horizontal force applied thereto at a point laterally of the grave mouth to disconnect the flaps from each other at said points successively to permit the flaps to hingingly depend into the grave.

SAUL I. FINEMAN.